(«12») United States Patent
Mastrogiacomo et al.

(10) Patent No.: US 10,753,809 B2
(45) Date of Patent: Aug. 25, 2020

(54) CONTACT FORCE TESTING APPARATUS, USE OF SUCH A CONTACT FORCE TESTING APPARATUS AND METHOD FOR PRODUCING SUCH A CONTACT FORCE TESTING APPARATUS (71) Applicant: KISTLER HOLDING AG, Winterthur (CH)

(72) Inventors: Giovanni Mastrogiacomo, Zurich (CH); Sandro Brandenberger, Andelfingen (CH); Paul Furter, Russikon (CH); Reinhard Staub, Herrliberg (CH); Rolf Thiel, Baenk (CH); Claudio Cavalloni, Regensdorf (CH)

(73) Assignee: KISTLER HOLDING, AG, Winterthur (CH)

( * ) Notice: Subject to any disclaimer, the term of this patent is extended or adjusted under 35 U.S.C. 154(b) by 424 days.

(21) Appl. No.: 15/565,327

(22) PCT Filed: Apr. 22, 2016

(86) PCT No.: PCT/EP2016/059086
§ 371 (c)(1),
(2) Date: Oct. 9, 2017

(87) PCT Pub. No.: WO2016/173952
PCT Pub. Date: Nov. 3, 2016

(65) Prior Publication Data
US 2018/0067002 A1    Mar. 8, 2018

(30) Foreign Application Priority Data
Apr. 30, 2015    (CH) .......................... 594/15

(51) Int. Cl.
*G01L 1/16* (2006.01)
*H01L 41/08* (2006.01)
(Continued)

(52) U.S. Cl.
CPC .............. *G01L 1/16* (2013.01); *G01L 5/0057* (2013.01); *G01L 1/18* (2013.01)

(58) Field of Classification Search
CPC ............ G01L 1/16; G01L 1/18; G01L 5/0057
See application file for complete search history.

(56) References Cited

U.S. PATENT DOCUMENTS 3,281,612 A    10/1966    Hatschek
5,024,106 A    6/1991    Hettinger
(Continued)

FOREIGN PATENT DOCUMENTS

DE    1949410 A1    4/1971
DE    2831938    2/1979
(Continued)

OTHER PUBLICATIONS

International Search Report and English translation, dated Jul. 7, 2016.
(Continued)

*Primary Examiner* — J. San Martin
(74) *Attorney, Agent, or Firm* — Dority & Manning, P.A.

(57) ABSTRACT

A contact force testing apparatus includes a measuring sensor that can be contacted with an electrical contact element and measures a contact force (F) of a contact with the electrical contact element. The measuring sensor includes piezoelectric material that receives the contact force (F) in a contact region and produces polarization charges. The measuring sensor includes an acceptor electrode that is completely surrounded by piezoelectric material in the contact region in the direction of a thickness extension (Continued)

of the measuring sensor and receives the polarization charges. A method is provided for the use of such a contact force testing apparatus, and a method is provided for producing such a contact force testing apparatus.

17 Claims, 5 Drawing Sheets

(51) Int. Cl.
*G01L 5/00* (2006.01)
*G01L 1/18* (2006.01)

(56) References Cited

U.S. PATENT DOCUMENTS

2007/0034027 A1* 2/2007 Wolfer .................. G01L 1/16
73/866.5
2010/0011884 A1* 1/2010 Schmitt-Walter .... A61B 5/1172
73/862.625
2015/0378493 A1* 12/2015 Kano ..................... G06F 3/044
345/173
2016/0238466 A1* 8/2016 Tanimoto ................. G01L 1/16

FOREIGN PATENT DOCUMENTS

| DE | 4003552 | 8/1991 |
| GB | 2465068 A | 5/2010 |
| JP | S52 14468 A | 2/1977 |
| JP | S52 169766 A | 12/1977 |

OTHER PUBLICATIONS

German language Written Opinion of the ISA.
Chinese Office Action and Translation, dated Jan. 19, 2020, 16 pages.

* cited by examiner

CONTACT FORCE TESTING APPARATUS, USE OF SUCH A CONTACT FORCE TESTING APPARATUS AND METHOD FOR PRODUCING SUCH A CONTACT FORCE TESTING APPARATUS

CROSS-REFERENCE TO RELATED APPLICATIONS

This application claims priority to International Application Serial No. PCT/EP2016/059086, filed Apr. 22, 2016, which claims priority to Swiss Application No. 00594/15, filed Apr. 30, 2015. International Application Serial No. PCT/EP2016/059086 is hereby incorporated herein in its entirety for all purposes by this reference.

FIELD OF THE INVENTION

The invention relates to a contact force testing apparatus comprising a measuring sensor, a use of such a contact force testing apparatus and a method for producing such a contact force testing apparatus.

BACKGROUND

Piezoelectric material is used in many locations to absorb pressure, force and acceleration. As described in the book "Piezoelectric Sensors" by G. Gautschi, published by Springer Verlag, a piezoelectric crystal such as quartz ($SiO_2$ single crystal), calcium gallo-germanate ($Ca_3Ga_2Ge_4O_{14}$ or CGG), langasite ($La_3Ga_5SiO_{14}$ or LGS), tourmaline, gallium orthophosphate, etc. can be cut into plate-shaped or rod-shaped elements, which elements are exposed to mechanical stresses. A piezoelectric pick-up therefore forms a capacitor in which the piezoelectric material is disposed between two acceptor electrodes. In the direct piezoelectric effect, electric polarization charges are thereby produced which are proportional to the magnitude of the mechanical stresses. If the electric polarization charges are produced on piezoelectric material surfaces, whose surface normal is parallel to the acting mechanical normal stress, a longitudinal piezoelectric effect exists. If the electric polarization charges are produced on piezoelectric material surfaces whose surface normal is perpendicular to the acting mechanical normal stress, a transverse piezoelectric effect exists. The electric polarization charges are received as an output signal via acceptor electrodes. The electrical insulation resistance between the acceptor electrodes is 10 T$\Omega$.

In addition to piezoelectric crystals, piezo-ceramics such as barium titanate ($BaTiO_3$), mixtures (PZT) of lead titanate ($PbTiO_3$) and lead zirconate ($PbZrO_3$), etc. and piezoelectric polymers such as polyvinylidene fluoride (PVDF), polyvinylfluoride (PVF), polyvinylchloride (PVC), etc. can also be used as piezoelectric material, as disclosed in DE2831938A1.

Electrical plug connections comprise male contact elements such as contact plugs, contact pins etc. and female contact elements such as contact couplings, contact sockets, etc. The male and female contact elements can be reversibly contacted with one another, for example, by means of a force fit. Thus, lamella contacts are known comprising a contact socket which has a plurality of lamellae spaced apart by slots in the longitudinal direction, which lamellae hold an inserted contact pin in the area of a contact overlap on the outer side by means of contact force. Such contacts must frequently fulfil a standardized contact force. During the production of electrical plug connections it is therefore checked as part of the quality control whether the contact force satisfies pre-defined desired values. At the same time, it is also checked whether the electrical plug connections reliably contact one another at elevated operating temperatures of 140° C. or even 160° C.

Piezoelectric polymers can be produced as thin layers of less than 100 µm thickness, which is not possible with piezoelectric crystals. The minimum thickness of piezoelectric crystals is 100 µm. Thus, piezoelectric polymers are predestined for very flat pick-ups. Also PVDF has a piezoelectric sensitivity around 10 times higher than $SiO_2$ single crystal. On the other hand, the elastic modulus of PVDF is around 40 times smaller than that of $SiO_2$ single crystal, which results in a comparatively low stiffness, with the result that PVDF can only be subjected to restricted mechanical loading, which in turn results in comparatively poor-quality output signals with high hysteresis and deviations from the linearity. PVDF also has a high temperature dependence of the piezoelectric properties, with the result that its area of usage is restricted to temperatures less than 80° C. whereas piezoelectric crystals such as LGS can even be used at temperatures of 600° C.

Known from DE4003552A1 is a contact force testing apparatus comprising a measuring sensor for measuring the contact force in electrical plug connections. The measuring sensor comprises a piezoelectric pick-up which consists of a layer of piezoelectric polymer which is disposed in the direction of its longitudinal extension centrally between two layers with acceptor electrodes. The piezoelectric pick-up is electrically insulated. For this purpose, a layer of electrical insulation material is disposed above and below each layer of acceptor electrodes and respectively one cover plate is disposed in turn thereabove and therebelow. The contact socket to be tested can be contacted by the measuring sensor via the cover plates, for which purpose the measuring sensor is inserted into the contact socket. The length with which the measuring sensor is inserted into the contact socket is called contact overlap. Width and thickness of the measuring sensor are 0.7 mm, the length of the contact overlap is 1.0 mm.

Now, the dimensions of electrical plug connections are becoming increasingly smaller and accordingly the contact force testing apparatus must also be constructed increasingly smaller. A first object of the present invention is to further miniaturize the known contact force testing apparatus and to provide a method for producing such a contact force testing apparatus. In addition, a use of a contact force testing apparatus for testing the electrical plug connections at elevated operating temperatures is required. Finally, the contact force testing apparatus should have the simplest possible structure, be favourable to produce, robust and stiff, and should ensure a long lifetime, a high availability and a high measurement accuracy. The invention also has these further objects.

BRIEF SUMMARY OF THE INVENTION

At least one of these objects is solved by the features described hereinafter.

The invention relates to a contact force testing apparatus comprising a measuring sensor which can be contacted with an electrical contact element and measures a contact force of a contact with the electrical contact element and wherein the measuring sensor comprises piezoelectric material which receives the contact force in a contact region and produces polarization charges. The measuring sensor comprises an acceptor electrode which is completely surrounded by piezoelectric material in the contact region in the direction of a thickness extension of the measuring sensor and which receives the polarization charges.

An advantage of the invention compared with the prior art according to DE4003552A1 therefore lies in the fact that the intrinsic insulation properties of the piezoelectric material are used to electrically insulate the measuring sensor. In the contact region in the direction of the thickness extension of the measuring sensor, no further electrical insulation material is therefore required which reduces the thickness of the measuring sensor and simplifies its structure. Such electrical insulation material such as ceramic, $Al_2O_3$ ceramic etc. is complex and therefore expensive to process, which simplifies the production of the contact force testing apparatus and makes this favourable. Also such further electrical insulation material exhibits a reduction in the insulation value over the lifetime and at high operating temperature, which restricts the use at elevated temperatures and restricts the lifetime and availability of the contact force testing apparatus.

The invention also relates to a use of such a contact force testing apparatus and a method for producing such a contact force testing apparatus.

BRIEF DESCRIPTION OF THE DRAWINGS

The invention is explained in detail hereinafter with reference to the drawings. In the figures

DESCRIPTION OF EXEMPLARY EMBODIMENTS OF THE INVENTION

Figure 1:
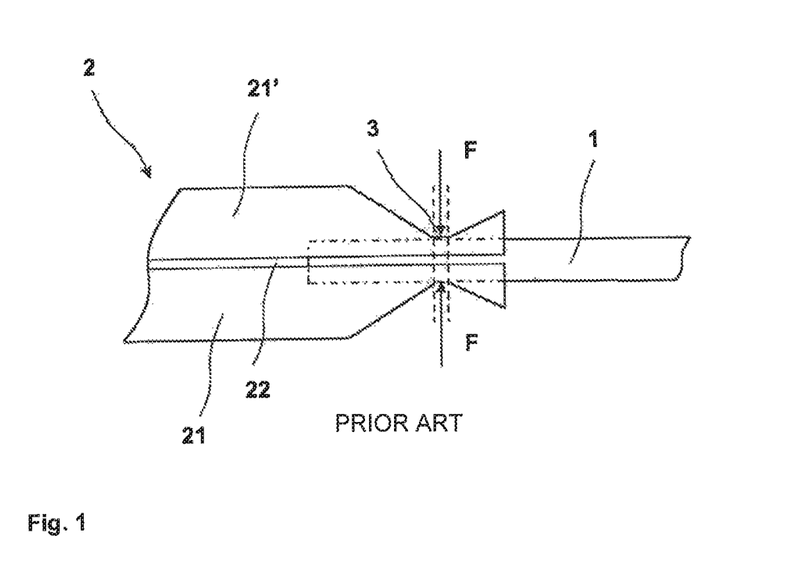
FIG. 1 shows a schematic view of an electrical plug connection which is reversibly contacted in a contact region with a contact force.

FIG. 1 shows in schematic view an electrical plug connection. The electrical plug connection comprises a male contact element in the form of a contact pin 1 and it has a female contact element in the form of a contact socket 2. The contact pin 1 can be reversibly contacted with the contact socket 2. To this end, the contact pin 1 is inserted into the contact socket 2 so that the two contact elements overlap in certain areas. The contact pin 1 is shown by a dot-and-dash line in the corresponding region of the contact overlap. A tight fit takes place in a contact region 3 characterized by delimiting dashed lines. The contact socket 2 is slotted in the region of the contact overlap, for example, a plurality of contact socket lamellae 21, 21' are spaced apart from one another in certain areas by at least one contact socket slot 22 and thus form a spring element. A contact force F is produced by outward bending of this spring element. The contact socket 2 can comprise a plurality of, for example, six contact socket lamellae. The contact elements are made of metallic material such as copper, copper alloys etc. The diameter of the contact pin 1 lies in the range of 0.35 mm to 25.4 mm. Depending on the size of the contact elements, the contact force F is in the range of 1 N to 10 N. Knowing the present invention, the spring element can also be mounted on the male contact element, as in a 4 mm cotter pin (banana plug).

Figure 2:
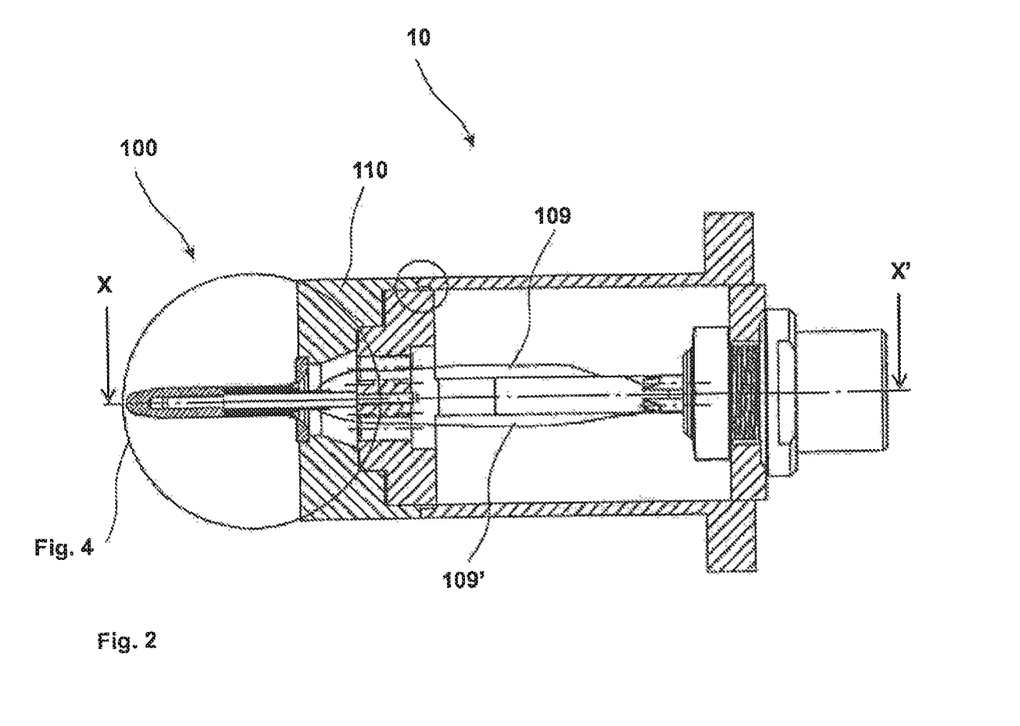
FIG. 2 shows a section through an embodiment of a contact force testing apparatus with measuring sensor.
Figure 4:
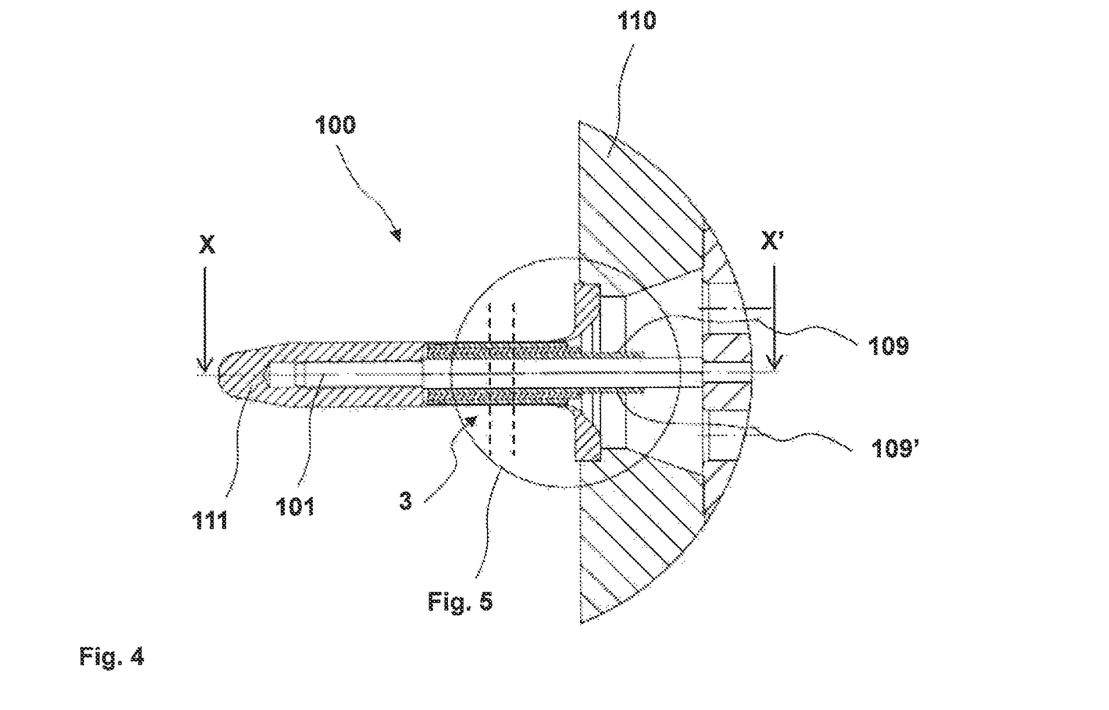
FIG. 4 shows a section through a section of the contact force testing apparatus from FIG. 2 with details of the measuring sensor.
Figure 5:
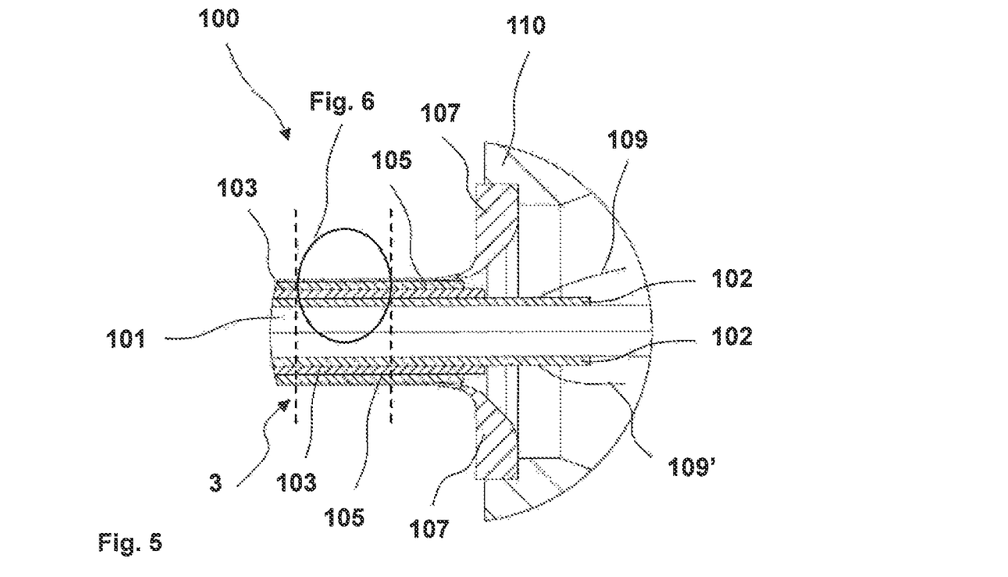
FIG. 5 shows an enlarged section through a section of the contact force testing apparatus from FIG. 4 with details of the contact region of the measuring sensor.
Figure 6:
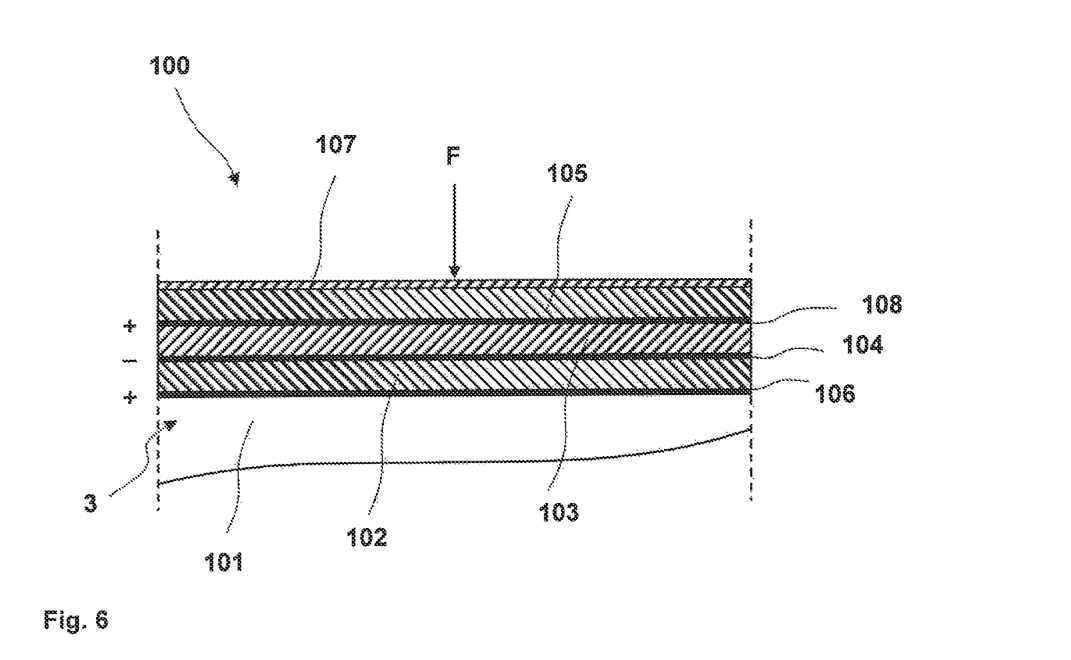
FIG. 6 shows an enlarged section through a section of the contact force testing apparatus from FIG. 5 with details of the structure of the measuring sensor.
Figure 7:
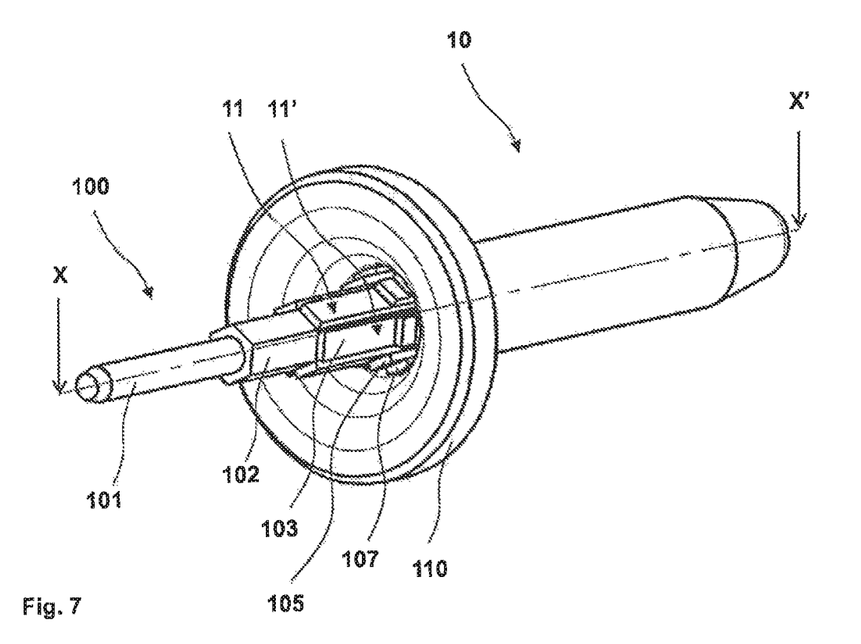
FIG. 7 shows a perspective view of the contact force testing apparatus from FIG. 2.
Figure 8:
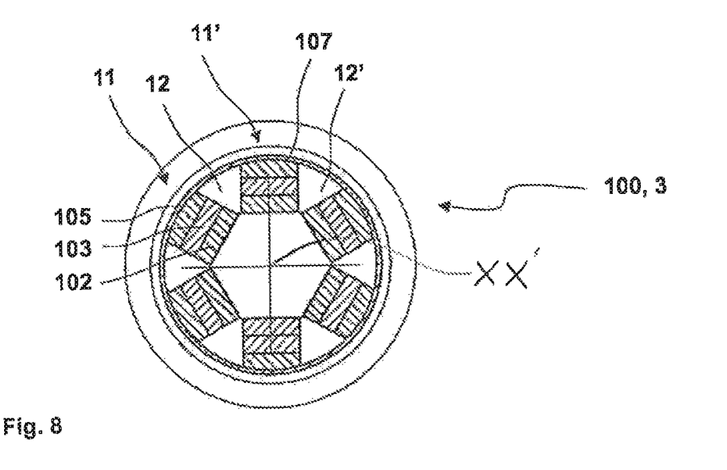
FIG. 8 shows a cross-section through a section of the contact force testing apparatus from FIG. 5 with details of the structure of the measuring sensor in the contact region.
Figure 9:
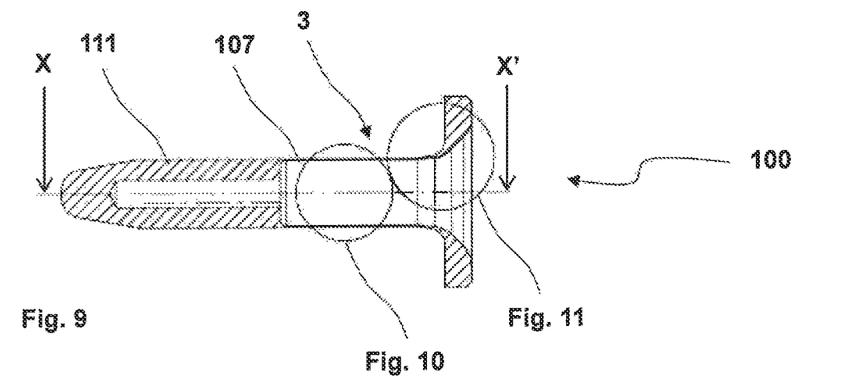
FIG. 9 shows a section through a section of the contact force testing apparatus from FIG. 4 with details of the protective cap and on the protective sleeve of the measuring sensor.
Figure 10:
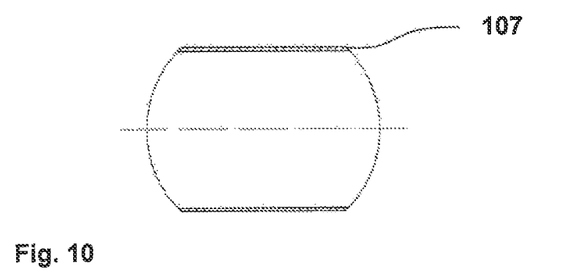
FIG. 10 shows a section through a section of the measuring sensor from FIG. 9 with details of the protective sleeve of the measuring sensor in the contact region.
Figure 11:
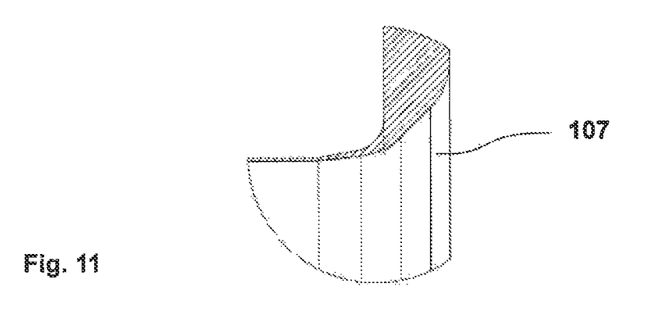
FIG. 11 shows a section through a section of the measuring sensor from FIG. 9 with details of the protective sleeve of the measuring sensor in the fastening region.

FIG. 2 shows a section through an embodiment of a contact force testing apparatus 10 with measuring sensor 100. The measuring sensor 100 can be contacted with a female contact element in the form of a contact socket 2 depicted in FIG. 3. Measuring sensor 100 and contact socket 2 have a largely circularly symmetrical structure in relation to a central axis XX'. An elongate extension of measuring sensor 100 and contact socket 2 runs parallel to the central axis XX' thereof. In FIGS. 2, 4, 7 and 9, the central axis XX' of the measuring sensor 100 is drawn at a central point of the measuring sensor 100. FIGS. 2, 4, 5, 6 and 9 are cut away in the direction of a thickness extension of the measuring sensor 100. The thickness extension of the measuring sensor 100 runs normal to the elongate extension of the measuring sensor 100. Details of the measuring sensor 100 are depicted in FIG. 4. Details of a contact region 3 of the measuring sensor 100 are shown in FIGS. 5 to 8. Details of a protective sleeve 107 of the measuring sensor 100 are shown in FIGS. 9 to 11. Knowing the present invention, a person skilled in the art can modify the measuring sensor in order to contact the measuring sensor with a male contact element In order to measure a contact force F of the female contact element, the measuring sensor 100 is positioned relative to the central axis XX' obliquely below the spring element of the female contact element. Oblique designates angles which differ from 0° or 180°. Angles of 0° or 180° are designated as parallel. The contact force F is measured as a normal contact force which acts normally to the central axis XX' and therefore parallel to the thickness extension of the measuring sensor 100. In FIG. 6 the contact force F is shown by a force arrow. The measuring sensor 100 has a protective cap 111 in a front region. The measuring sensor 100 comprises piezoelectric material 102, 103 in the contact region 3. The measuring sensor 100 is inserted into the female contact element via the protective cap 111. In this case, the protective cap 111 slides over an inner surface of the female contact element until the contact region 3 of the measuring sensor 100 is positioned underneath the spring element of the female contact element. In order to keep the wear in this position as low as possible, the protective cap 111 is made of abrasion-resistant material such as stainless steel, steel alloys etc. and has a tapering tip as insertion aid. Naturally the protective cap 111 itself cannot be too abrasion-resistant in order not to damage the female contact element by abrasion during measurement of the contact force.

The measuring sensor 100 receives the contact force F in the contact region 3 via the piezoelectric material 102, 103. As shown in FIG. 6, the measuring sensor 100 also has an acceptor electrode 104 which is completely surrounded by piezoelectric material 102, 103 in the contact region 3 in the direction of the thickness extension of the measuring sensor 100 and receives the polarization charges. The beginning and end of the contact region 3 are characterized by dashed lines, for example, in FIGS. 4 to 6. Protective cap 111 and contact region 3 are arranged along the elongate extension of the measuring sensor 100. Finally, as shown in FIGS. 5-7, the measuring sensor 100 is attached to a carrier 110 in a fastening region. The contact force testing apparatus 10 can be fastened in a stable fixed position by means of the carrier 110. The carrier 110 is made of mechanically resistant material such as stainless steel, steel alloys etc.

The piezoelectric material 102, 103 can consist of piezoelectric crystal such as ($SiO_2$ single crystal), calcium-gallogermanate ($Ca_3Ga_2Ge_4O_{14}$ or CGG), langasite ($La_3Ga_5SiO_{14}$ or LGS), tourmaline, gallium orthophosphate, etc. However, the piezoelectric material 102, 103 can also consist of piezo-ceramics such as barium titanate ($BaTiO_3$), mixtures (PZT) of lead titanate ($PbTiO_3$) and lead zirconate ($PbZrO_3$), etc. as well as piezoelectric polymers such as polyvinylidene fluoride (PVDF), polyvinylfluoride (PVF), polyvinylchloride (PVC), etc. The measuring sensor 100 comprises at least two layers of piezoelectric material 102, 103 having a thickness of less than/equal to 200 µm. When using piezoelectric material 102, 103 comprising piezoelectric crystal, the layers are cut as plate-shaped or rod-shaped elements having a defined crystal orientation. If the piezoelectric material 102, 103 consists of piezoelectric crystal, the contact force testing apparatus 10 can be used at operating temperatures at least equal to 100° C., preferably at operating temperatures in the range of 140° C. to 160° C., preferably at operating temperatures less than or equal to 600° C. If the piezoelectric material 102, 103 consists of piezoelectric polymers, the layers are available as thin films. The piezoelectric material can be deposited in commonly used thin-film methods with defined crystal orientation.

The layers of piezoelectric material 102, 103 are metallized on one or both sides. The metallization can be accomplished by thermolamination with a metal film or by deposition of metal. Copper, copper alloys, gold, gold alloys, aluminium, aluminium alloys, silver, silver alloys, etc. can be used as metal.

The layers of piezoelectric material 102, 103 are oriented crystallographically so that under the action of the contact force F, the electric polarization charges on one layer side are produced as electrically negative surface charges and on the other layer side as electrically positive surface charges. In order to receive the electrically negative surface charges, the layers of piezoelectric material 102, 103 on the side of the generated electrically negative surface charges are provided with a first metallization. In order to receive the electrically positive surface charges, the layers of piezoelectric material 102, 103 on the side of the generated electrically positive surface charges are provided with a second and third metallization.

However, the first metallization is also used as joining material. This is because, in order to increase the sensitivity of the measuring sensor 100 and in order to be able to further process the piezoelectric material 102, 103 using commonly used manufacturing methods, as shown in FIG. 6, two layers of piezoelectric material 102, 103 are connected to one another in a firmly bonded manner by means of their first metallizations. This firmly bonded connection is made by diffusion welding (thermocompression bonding), soldering, adhesive bonding using electrically conductive adhesive material etc. Thus, the firmly bonded interconnected first metallizations form an acceptor electrode 104 in the form of a layer of metallic material. The acceptor electrode 104 is disposed between two adjacent layers of piezoelectric material 102, 103 and receives its electrically negative surface charges. This acceptor electrode 104 is a factor of 2, preferably a factor of 10, thinner than acceptor electrodes from the prior art. Advantageously the thickness of the first metallizations is greater than/equal to the maximum roughness of the piezoelectric material 102, 103. This ensures that the metal of the first metallizations can diffuse well during diffusion welding at relatively low metallization temperatures between 100° C. and 450° C. and that after the diffusion welding this metal thus largely covers all the surface regions of the interconnected layers of piezoelectric material 102, 103. This is because at such relatively low temperatures the piezoelectric material 102, 103 does not diffuse or only diffuses slightly. Consequently, the acceptor electrode 104 can largely receive all electrically negative surface charges which in turn results in high-quality output signals with low hysteresis of less than/equal to 3% FSO and high linearity of less than/equal to 3% FSO, where FSO is the abbreviation for Full Scale Output, or in German, Vollbereichssignal. The layer of metallic material thus formed has a thickness of less than/equal to 5 µm.

As shown in FIG. 5, the polarization charges received by the acceptor electrode 104 are removed via an electrical conductor 109, 109' and can be evaluated. For a simple and secure electrical connection of the electrical conductor 109, 109' with the acceptor electrode 104, a first layer of piezoelectric material 102 in the direction of the elongate extension of the measuring sensor 100 is configured to be longer than a second layer of piezoelectric material 103. According to FIGS. 4 and 5, the first layer of piezoelectric material 102 in the direction of the thickness extension of the measuring sensor 100 is arranged closer to the central axis XX' and is configured to be longer in certain areas. The first layer of piezoelectric material 102 has a first metallization on the side facing away from the central axis XX'. In the area where the first layer of piezoelectric material 102 is configured to be longer, the first metallization of the first layer of piezoelectric material 102 is exposed and is accessible for an electrical connection to the electrical conductor 109, 109'. This electrical connection can be firmly bonded and can be accomplished by diffusion welding, adhesive bonding using electrically conductive adhesive material etc. However, this electrical connection can also be non-positive and be accomplished by spring contact, etc. In each case, a layer of piezoelectric material 102 is thus electrically connected to an electrical conductor 109, 109'. The electrical conductor 109, 109' is in turn electrically connected to a charge amplifier not shown, which charge amplifier converts the received polarization charges into a voltage directly proportional thereto.

As shown in FIGS. 5, 6 and 7, the measuring sensor 100 comprises a base plate 101 which is disposed in the direction of the elongate extension of the measuring sensor 100. The base plate 101 is made of mechanically resistant material such as stainless steel, steel alloys, ceramics, $Al_2O_3$ ceramics etc. As shown in FIGS. 4 to 6, the first layer of piezoelectric material 102 is connected on one side in a firmly bonded manner to the base plate 101 and the second layer of piezoelectric material 103 is connected on one side in a firmly bonded manner to a cover plate 105. The cover plate 105 is made from the stiffest possible material such as stainless steel, steel alloys, ceramics, $Al_2O_3$ ceramics etc. For the firmly bonded connection to the layers of piezoelectric material 102, 103, base plate 101 and cover plate 105 can be metallized. The stiffness is obtained from the elastic modulus of the material of the cover plate 105 and the geometry of the cover plate 105. A high stiffness gives a small change in volume and a high eigenfrequency under mechanical stresses which results in high-quality output signals with low hysteresis of less than/equal to 3% FSO and high linearity of less than/equal to 3% FSO.

In order to receive the electrically positive surface charges, the first layer of piezoelectric material 102 is provided with a second metallization on the side of the generated electrically positive surface charges. As shown in FIG. 6, a firmly bonded connection 106 of the first layer of piezoelectric material 102 with the base plate 101 is accomplished by diffusion welding of the second metallization with the base plate 101. And in order to receive electrically positive surface charges, the second layer of piezoelectric material 103 is provided with a third metallization on the side of the generated electrically positive surface charges. A firmly bonded connection 108 of the second layer of piezoelectric material 103 with the cover plate 105 is made by diffusion welding of the third metallization to the cover plate 105. Knowing the present invention, the person skilled in the art can also implement the firmly bonded connections 106, 108 by soldering or by adhesive bonding using electrically conductive adhesive material etc. The second and third metallization serve as a counterelectrode for receiving the electrically positive surface charges of the two layers of piezoelectric material 102, 103. The counterelectrode is electrically connected to the charge amplifier by means of electrical conductors not shown. As shown in FIG. 8, the outer side of the cover plate 105 facing away from the central axis XX' is convexly shaped. This outer side has a radius of curvature which largely corresponds to the distance of the base plate 101 from the central point of the measuring sensor 100 to the cover plate 105.

Figure 3:
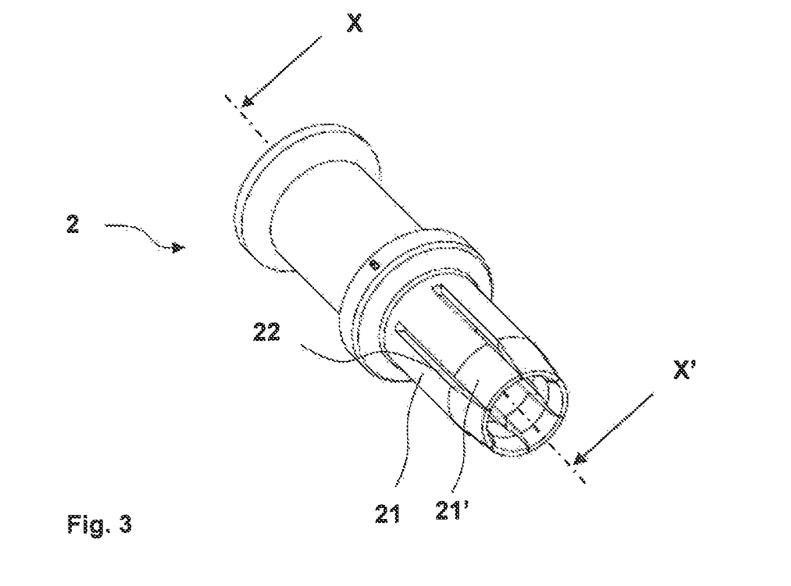
FIG. 3 shows a view of an embodiment of a female contact element whose contact force can be measured using the contact force testing apparatus from FIG. 2.

As shown in FIG. 3, the female contact element 2 in the embodiment of a contact socket as spring element has six contact socket lamellae 21, 21' which are spaced apart in certain areas by contact socket slots 22. The contact force F of this female contact element 2 can be measured using the contact force testing apparatus 10 from FIG. 2. For this purpose the measuring sensor 100 as shown in FIGS. 7 and 8 has six piezoelectric pick-ups 11, 11'. Each piezoelectric pick-up 11, 11' is connected mechanically to the base plate 101. Preferably the piezoelectric pick-ups 11, 11' are connected via the second metallization of the first layer of piezoelectric material 102 to the base plate 101 in a firmly bonded manner. Each piezoelectric pick-up 11, 11' comprises a first layer of piezoelectric material 102 with second metallization, an acceptor electrode 104 and a cover plate 105 with third metallization. The first layer of piezoelectric material 102 is connected to the base plate 101 in the contact region 3 via a side facing the central axis XX'. The acceptor electrode 104 is connected to the first layer of piezoelectric material 102 in the contact region 3 via a side facing the central axis XX'. The second layer of piezoelectric material 103 is connected to the acceptor electrode 104 in the contact region 3 via a side facing the central axis XX'. The cover plate 105 is connected to the second layer of piezoelectric material 103 in the contact region via a side facing the central axis XX'. Width and length of a piezoelectric pick-up 11, 11' in the contact region 3 correspond to those of a contact socket lamella 21, 21'. In relation to the central axis XX' of the female contact element 2 and the measuring sensor 100, the contact socket lamellae 21, 21' and the piezoelectric pick-ups 11, 11' are arranged rotationally offset with respect to one another. For example, the piezoelectric pick-ups 11, 11' are arranged symmetrically rotationally offset with respect to one another with an angle of the rotational offset which is obtained from the angular magnitude of the full circle of 360° divided by the number of piezoelectric pick-ups 11, 11', in the present case therefore with an angle of rotational offset of 60°. Adjacent piezoelectric pick-ups 11, 11' are spaced apart from one another by a pick-up gap 12, 12'. In relation to the central axis XX', during insertion of the measuring sensor 100 into the female contact element 2, precisely one of the piezoelectric pick-ups 11, 11' comes to lie in the contact region non-positively under precisely one contact socket lamella 21, 21'. Knowing the present invention, the person skilled in the art can arrange more or less piezoelectric pick-ups 11, 11' with a rotational offset to one another. In the case of four piezoelectric pick-ups 11, 11', the angle of the rotational offset is 90°, in the case of eight piezoelectric pick-ups 11, 11', the angle of the rotational offset is 45°. The spring force of the contact socket lamellae 21, 21' can thus be measured individually or integrally. In the case of individual measurement of the spring force, each piezoelectric pick-up 11, 11' measures the contact force F of a contact socket lamella 21, 21'. In the case of integral measurement of the spring force, all the piezoelectric pick-ups 11, 11' measure the contact force F of all the contact socket lamellae 21, 21'. In this way, it can be determined whether the contact force F of individual contact socket lamellae 21, 21' meets predefined desired values or whether the contact force of the spring element of the female contact element 2 meets predefined desired values.

As shown in FIGS. 5-11, the measuring sensor 100 comprises a membrane-like protective sleeve 107. During contact of the measuring sensor 100 with the electrical contact element 1, 2, the protective sleeve 107 abuts directly against the electrical contact element 1, 2. The protective sleeve 107 fulfils at least one of the following functions: it protects the piezoelectric pick-ups 11, 11', it protects the pick-up gaps 12, 12' and it protects the electrical conductors 109, 109' of the measuring sensor 100. The protective sleeve 107 protects against harmful environmental influences such as impurities (dust, moisture etc.). Such impurities disadvantageously influence the lifetime and the availability of the measuring sensor 100. To this end the protective sleeve 107 through its mechanical extension prevents the penetration of such impurities into the measuring sensor 100. However, the protective sleeve 107 also protects against electrical and electromagnetic interference effects in the form of electromagnetic radiation and thus enables the electromagnetic compatibility of the measuring sensor 100 and therefore of the contact force testing apparatus 10. To this end, the protective sleeve 107 is made of electrically conductive material and absorbs interfering electromagnetic radiation and diverts resulting electric currents. As a result of its mechanical extension, the protective sleeve 107 is an electric shielding of the measuring sensor 100. Protective sleeve 107, protective cap 109 and carrier 110 form an electrical shielding of the measuring sensor 100.

Details of the protective sleeve 107 are shown in FIGS. 5 to 11. The protective sleeve 107 for example rests flush against the protective cap 111 in a front region of the measuring sensor 100 and in a rear region of the measuring sensor 100 is connected in a firmly bonded manner to the carrier 110. This firmly bonded connection is made by welding, laser welding, soldering, adhesive bonding using electrically conductive adhesive material etc. The electrical conductors 109, 109' form an electrical connection with the first metallization of the first layer of piezoelectric material 102. This electrical connection is completely covered from the outside by the protective sleeve 107 relative to the central axis XX'. The protective sleeve 107 is made of material such as stainless steel, steel alloys, etc. The protective sleeve 107 is circularly symmetrical in the contact region 3 and in the contact region 3 completely covers from the outside the piezoelectric pick-ups 11, 11' and the pick-up gaps 12, 12' relative to the central axis XX'. A radius of curvature of the outer side of the cover plate 105 is less than or equal to an inner radius of the protective sleeve 107. As shown in FIG. 10, the protective sleeve 107 is very thin in the contact region 3, with a thickness of less than or equal to 200 μm, preferably 50 μm. For mounting, the piezoelectric pick-ups 11, 11' are mechanically connected to the base plate 101 and the protective sleeve 107 is pulled in the direction of the elongate extension of the measuring sensor 100 over the piezoelectric pick-ups 11, 11' connected mechanically to the base plate 101. The protective sleeve 107 thus lies non-positively on the outer sides of the cover plates 105 and biases the layers of piezoelectric material 102, 103 with a defined bias with respect to the base plate 101. Knowing the present invention, protective sleeve 107 and protective cap 111 can also be produced in one piece.

REFERENCE LIST

XX' Central axis
F Contact force
1 Contact pin
2 Contact socket
3 Contact region
10 Contact force testing apparatus
11, 11' Piezoelectric pick-ups
12, 12' Pick-up gaps
21, 21' Contact socket lamella
22 Contact socket slot
100 Measuring sensor
101 Base plate
102 First layer of piezoelectric material
103 Second layer of piezoelectric material
104 First metallization or pick-up electrode
105 Cover plate
106 Second metallization
107 Protective sleeve
108 Third metallization
109, 109' Electrical conductors
110 Carrier
111 Protective cap

The invention claimed is:

1. Contact force testing apparatus for measuring a contact force (F) of an electrical contact between a male plug connection and a female plug connection of an electrical plug connection, the apparatus comprising:
a measuring sensor including piezoelectric material which receives the contact force in a contact region and produces polarization charges, wherein the measuring sensor comprises an acceptor electrode which is completely surrounded by the piezoelectric material in the contact region in the direction of a thickness extension of the measuring sensor and receives the polarization charges;
wherein the measuring sensor comprises a plurality of layers of piezoelectric material; wherein the acceptor electrode includes two adjacent layers of piezoelectric material and a layer of metallic material disposed between the two adjacent layers of piezoelectric material in the direction of the thickness extension of the measuring sensor;
wherein the measuring sensor includes a base plate having a second metallization on one side of the base plate, wherein the second metallization connects a first layer of the plurality of layers of piezoelectric material in a firmly bonded manner to the base plate.

2. The contact force testing apparatus according to claim 1, wherein the layer of metallic material consists of first metallizations of the two adjacent layers of piezoelectric material, which first metallizations are connected to one another in a firmly bonded manner.

3. The contact force testing apparatus according to claim 2, wherein the thickness of the first metallizations is at least equal to the maximum roughness of the piezoelectric material.

4. The contact force testing apparatus according to claim 2, wherein a first layer of the plurality of layers of piezoelectric material in the direction of an elongate extension of the measuring sensor is configured to be longer than a second layer of the plurality of layers of piezoelectric material; that in the region where the first layer of the plurality of layers of piezoelectric material is configured to be longer, the first metallization of the first layer of the plurality of layers of piezoelectric material is connected in a firmly bonded manner to an electrical conductor.

5. The contact force testing apparatus according to claim 1, wherein the measuring sensor includes a cover plate that is connected in a firmly bonded manner to a second layer of piezoelectric material; wherein the cover plate of the measuring sensor is provided on one side with a third metallization, which cover plate is connected via the third metallization in a firmly bonded manner to a second layer of piezoelectric material.

6. The contact force testing apparatus according to claim 5, wherein the measuring sensor comprises a plurality of piezoelectric pick-ups; that each piezoelectric pick-up comprises a first layer of piezoelectric material with the second metallization, the acceptor electrode and a cover plate with the third metallization; and that the piezoelectric pick-ups are arranged rotationally offset with respect to one another by a central axis of the measuring sensor.

7. The contact force testing apparatus according to claim 6, wherein the contact force of an electrical contact element contacted in the contact region by the contact force testing apparatus acts obliquely to the longitudinal extension of the measuring sensor; the electrical contact element is a contact socket with contact socket lamellae; and that the piezoelectric pick-ups lie underneath the contact socket lamellae with respect to the central axis of the measuring sensor.

8. The contact force testing apparatus according to claim 7, wherein precisely one piezoelectric pick-up of the measuring sensor lies underneath precisely one contact socket lamella; and that each piezoelectric pick-up is disposed to measure the contact force of a contact socket lamella.

9. The contact force testing apparatus according to claim 7, wherein all the piezoelectric pick-ups are disposed to measure the contact force of all the contact socket lamellae.

10. The contact force testing apparatus according to claim 1, wherein the measuring sensor comprises a plurality of piezoelectric pick-ups; that the piezoelectric pick-ups are spaced apart from one another by pick-up gaps; that the measuring sensor has a protective sleeve; and that the protective sleeve covers the piezoelectric pick-ups and the pick-up gaps in the contact region.

11. The contact force testing apparatus according to claim 10, wherein the protective sleeve abuts non-positively against the piezoelectric pick-ups in the contact region.

12. The contact force testing apparatus according to claim 1, wherein the measuring sensor is only electrically insulated by the piezoelectric material in the contact region.

13. Use of a contact force testing apparatus according to claim 1, wherein the piezoelectric material consists of piezoelectric crystal; and that the contact force testing apparatus can be used at operating temperatures in the range of 140° C. to 160° C.

14. The contact force testing apparatus according to claim 2, wherein a first layer of the plurality of layers of piezoelectric material in the direction of an elongate extension of the measuring sensor is configured to be longer than a second layer of the plurality of layers of piezoelectric material; wherein in the region where the first layer of the plurality of layers of piezoelectric material is configured to be longer, the first metallization of the first layer of the plurality of layers of piezoelectric material is connected non-positively to an electrical conductor.

15. Method for producing a contact force testing apparatus having a measuring sensor including a plurality of layers of piezoelectric material, a base plate bonded to one of the layers of piezoelectric material, and an acceptor electrode in electrical contact with two of the plurality of layers of piezoelectric material, the method comprising the steps of:
providing a base plate made from mechanically resistant material and defining a first side;
preparing two layers of piezoelectric material;
metallizing a first side of each of the two layers of piezoelectric material with a first metallization;
connecting the two layers of piezoelectric material to one another in a firmly bonded manner via their first metallizations to form the acceptor electrode;
metallizing the first side of the base plate with a second metallization; and
connecting one of the two layers of piezoelectric material in a firmly bonded manner to the second metallization of the base plate.

16. Method for producing components of a contact force testing apparatus having a measuring sensor including a plurality of layers of piezoelectric material, a base plate bonded to one of the layers of piezoelectric material, and an acceptor electrode in electrical contact with two of the plurality of layers of piezoelectric material, the method comprising the steps of:
providing a base plate made from mechanically resistant material and defining a first side;
preparing two layers of piezoelectric material;
metallizing one side of each of the two layers of piezoelectric material with a respective first metallization;
connecting the two layers of piezoelectric material to one another in a firmly bonded manner via their respective first metallization to form the acceptor electrode;
metallizing the first side of the base plate with a second metallization; and
connecting a first layer of the plurality of piezoelectric layers of piezoelectric material in a firmly bonded manner to the second metallization of the base plate.

17. The method of claim 16, wherein the first metallizations of the two layers of piezoelectric material are connected to one another in a firmly bonded manner by diffusion welding at metallization temperatures between 100° C. and 450° C.

* * * * *